United States Patent
Naser et al.

(10) Patent No.: US 11,457,211 B2
(45) Date of Patent: Sep. 27, 2022

(54) FLEXIBLE IMPLEMENTATIONS OF MULTIPLE TRANSFORMS

(71) Applicant: InterDigital VC Holdings, Inc., Wilmington, DE (US)

(72) Inventors: Karam Naser, Cesson-Sevigne (FR); Tangi Poirier, Cesson-Sevigne (FR); Gagan Bihari Rath, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/045,460

(22) PCT Filed: Apr. 29, 2019

(86) PCT No.: PCT/US2019/029731
§ 371 (c)(1),
(2) Date: Oct. 5, 2020

(87) PCT Pub. No.: WO2019/212987
PCT Pub. Date: Nov. 7, 2019

(65) Prior Publication Data
US 2021/0160498 A1 May 27, 2021

(30) Foreign Application Priority Data

Apr. 30, 2018 (EP) ..................................... 18290041
Jun. 21, 2018 (EP) ..................................... 18305794

(51) Int. Cl.
*H04N 19/61* (2014.01)
*H04N 19/122* (2014.01)
(Continued)

(52) U.S. Cl.
CPC ......... *H04N 19/122* (2014.11); *H04N 19/176* (2014.11); *H04N 19/61* (2014.11); *H04N 19/91* (2014.11)

(58) Field of Classification Search
CPC .... H04N 19/122; H04N 19/176; H04N 19/61; H04N 19/91
(Continued)

(56) References Cited

U.S. PATENT DOCUMENTS

2014/0254661 A1    9/2014  Saxena et al.
2017/0188029 A1*   6/2017  An ......................... H04N 19/12
2019/0306522 A1*  10/2019  Said ........................ G06F 17/16

OTHER PUBLICATIONS

Chen et al., "Algorithm Description of Joint Exploration Test Model 6 (JEM 6)", Joint Video Exploration Team (JVET) of ITU-T SG 16 WP 3 and ISO/IEC JTC 1/SC 29/WG 11, Document: JVET-F1001-v3, pp. 1-50, 6th meeting, Hobart, AU, Mar. 31-Apr. 7, 2017.
(Continued)

*Primary Examiner* — Nguyen T Truong
(74) *Attorney, Agent, or Firm* — Xiaoan Lu

(57) ABSTRACT

In video coding, a transform can be selected from multiple transform sets. To efficiently implement multiple transforms, a unified architecture of implementing the Discrete Trigonometric Transforms (DTTs) or flipped DTT can be used. In the proposed unified architecture, the relationships between the transforms are utilized. In particular, all transforms can be implemented based on DCT-II, DCT-IV, a reverse order operation, and a sign changing operation for odd elements. The DCT-II can be implemented at a minimum size, and other sizes for DCT-II can be implemented recursively from the minimum size DCT-II and DCT-IV at various sizes. In one example, the multiple transforms are {DCT-II, DST-II, DCT-III, DST-III, DCT-IV, DST-IV}. The relationships between transforms can also be used to guide the design of (Continued)

additional transforms that can be implemented by the unified architecture.

10 Claims, 12 Drawing Sheets

(51) Int. Cl.
 *H04N 19/176* (2014.01)
 *H04N 19/91* (2014.01)
(58) Field of Classification Search
 USPC .................................................. 375/240.12
 See application file for complete search history.

(56) References Cited

OTHER PUBLICATIONS

Biatek, et al., "Low-Complexity Adaptive Multiple Transforms for Post-HEVC Video Coding", 2016 Picture Coding Symposium (PCS), IEEE, Nuremberg, pp. 1-5, Germany, Dec. 4-7, 2016.

Fan et al., "Adaptive Boundary Dependent Transform Optimization for HEVC", 2015 Picture Coding Symposium (PCS), IEEE, pp. 1-5, Cairns, QLD, Australia, May 31-Jun. 3, 2015.

De Luxan Hernandez et al., "Block Adaptive Selection of Multiple Core Transform for Video Coding", 2016 Picture Coding Symposium (PCS), IEEE, pp. 1-5, Nuremberg, Germany, Dec. 4-7, 2016.

Reznik, "Relationship Between DCT-II, DCT-VI, and DST-VII Transforms", 2013 IEEE International Conference on Acoustics, Speech and Signal Processing, pp. 5642-5646, Vancouver, BC, Canada, May 26-31, 2013.

Chan et al., "Multiplier-Less Discrete Sinusoidal and Lapped Transforms Using Sum-of-Power-of-Two (SOPOT) Coefficients", ISCAS 2001. The 2001 IEEE International Symposium on Circuits and Systems (Cat. No.01CH37196), pp. 13-16, Sydney, NSW, Australia, May 6-9, 2001.

Masera et al., "Odd Type DCT/DST for Video Coding: Relationships and Low-Complexity Implementations", 2017 IEEE International Workshop on Signal Processing Systems (SIPS), IEEE, pp. 1-6, Lorient, France, Oct. 3-5, 2017.

* cited by examiner

FLEXIBLE IMPLEMENTATIONS OF MULTIPLE TRANSFORMS

This application claims the benefit, under 35 U.S.C. § 371 of International Application No. PCT/US2019/029731, filed Apr. 29, 2019, which was published on Nov. 7, 2019, which claims the benefit of European Patent Application Nos. EP18290041.5 filed Apr. 30, 2018 and EP18305794.2 filed Jun. 21, 2018.

TECHNICAL FIELD

The present embodiments generally relate to a method and an apparatus for video encoding or decoding, and more particularly, to a method and an apparatus for transform design in video encoding or decoding.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to a general aspect, a method for decoding video data is presented, comprising: accessing transform coefficients of a block of a picture in a video; inverse transforming said transform coefficients of said block, using a transform type from a plurality of transform types, to form a block of prediction residuals, wherein each of said plurality of transform types corresponds to a DTT (Discrete Trigonometric Transform) or a flipped DTT, wherein implementation of each of said plurality of transform types includes implementation of one or both of (1) DCT-II type of transform and (2) DCT-IV type of transform; and reconstructing said block responsive to said block of prediction residuals.

According to another general aspect, a method for encoding video data is presented, comprising: accessing prediction residuals of a block of a picture in a video; transforming said prediction residuals of said block, using a transform type from a plurality of transform types, to form a block of transform coefficients, wherein each of said plurality of transform types corresponds to a DTT (Discrete Trigonometric Transform) or a flipped DTT, wherein implementation of each of said plurality of transform types includes implementation of one or both of (1) DCT-II type of transform and (2) DCT-IV type of transform; and entropy encoding said transform coefficients.

According to another general aspect, an apparatus for decoding video data is presented, comprising at least a memory and one or more processors coupled to said at least a memory, wherein said one or more processors are configured to: access transform coefficients of a block of a picture in a video; inverse transform said transform coefficients of said block, using a transform type from a plurality of transform types, to form a block of prediction residuals, wherein each of said plurality of transform types corresponds to a DTT (Discrete Trigonometric Transform) or a flipped DTT, wherein implementation of each of said plurality of transform types includes implementation of one or both of (1) DCT-II type of transform and (2) DCT-IV type of transform; and reconstruct said block responsive to said block of prediction residuals.

According to another general aspect, an apparatus for encoding video data is provided, comprising at least a memory and one or more processors coupled to said at least a memory, wherein said one or more processors are configured to: access prediction residuals of a block of a picture in a video; transform said prediction residuals of said block, using a transform type from a plurality of transform types, to form a block of transform coefficients, wherein each of said plurality of transform types corresponds to a DTT (Discrete Trigonometric Transform) or a flipped DTT, wherein implementation of each of said plurality of transform types includes implementation of one or both of (1) DCT-II type of transform and (2) DCT-IV type of transform; and entropy encode said transform coefficients.

According to another general aspect, a bitstream is generated by performing: accessing prediction residuals of a block of a picture in a video; transforming said prediction residuals of said block, using a transform type from a plurality of transform types, to form a block of transform coefficients, wherein each of said plurality of transform types corresponds to a DTT (Discrete Trigonometric Transform) or a flipped DTT, wherein implementation of each of said plurality of transform types includes implementation of one or both of (1) DCT-II type of transform and (2) DCT-IV type of transform; and entropy encoding said transform coefficients.

One or more of the present embodiments also provide a computer readable storage medium having stored thereon instructions for encoding or decoding video data according to at least part of any of the methods described above. One or more embodiments also provide a computer readable storage medium having stored thereon a bitstream generated according to the methods described above. One or more embodiments also provide a method and apparatus for transmitting or receiving the bitstream generated according to the methods described above. One or more embodiments also provide a computer program product including instructions for performing at least part of any of the methods described above.

DETAILED DESCRIPTION

Figure 1:
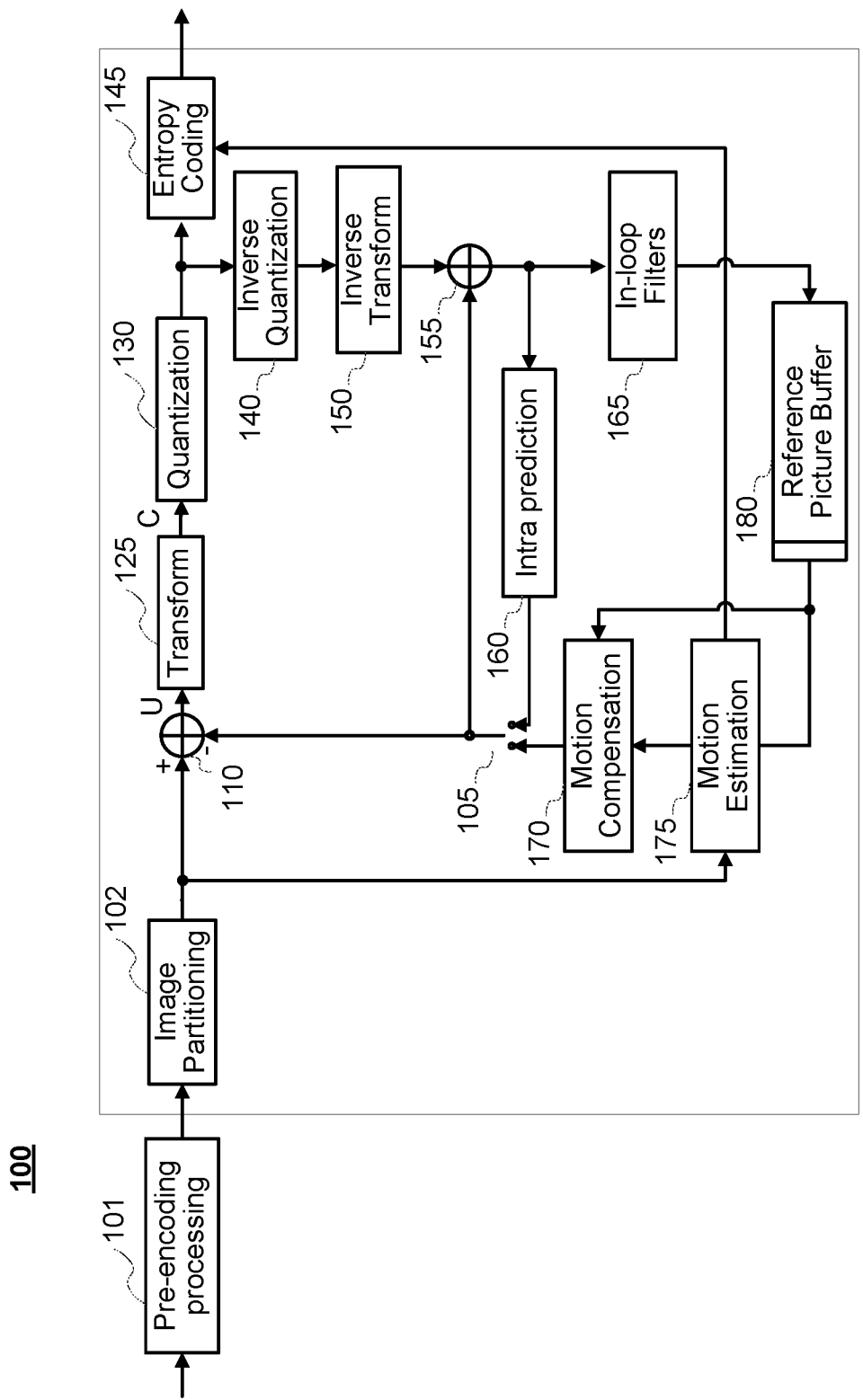
FIG. 1 illustrates a block diagram of an embodiment of a video encoder.

FIG. 1 illustrates a block diagram of an exemplary video encoder 100. FIG. 1 may illustrate a High Efficiency Video Coding (HEVC) encoder, a JEM (Joint Exploration Model) encoder under development by JVET (Joint Video Exploration Team), or an encoder employing technologies similar to those used in HEVC or JEM.

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

To encode a video sequence with one or more pictures, a picture is partitioned (102). In the present application, the term "block" can be used to refer, for example, to any of CTU (Coding Tree Unit), CU (Coding Unit), PU (Prediction Unit), TU (Transform Unit), CB (Coding Block), PB (Prediction Block), and TB (Transform Block) as used in HEVC or JEM. In addition, the "block" can also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of, for example, CUs. Each coding unit is encoded using either an intra or inter mode. When a coding unit is encoded in an intra mode, it performs intra prediction (160). In an inter mode, motion estimation (175) and compensation (170) are performed. The encoder decides (105) which one of the intra mode or inter mode to use for encoding the coding unit, and indicates the intra/inter decision by a prediction mode flag. Prediction residuals are calculated by subtracting (110) the predicted block from the original image block.

The prediction residuals are then transformed (125) and quantized (130). The transforms are generally based on separable transforms. For instance, a DCT transform is first applied in the horizontal direction, then in the vertical direction. The quantized transform coefficients, as well as motion vectors and other syntax elements, are entropy coded (145), for example, using context-based adaptive binary arithmetic coding (CABAC), to output a bitstream.

The encoder may skip the transform and apply quantization directly to the non-transformed residual signal, for example, on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
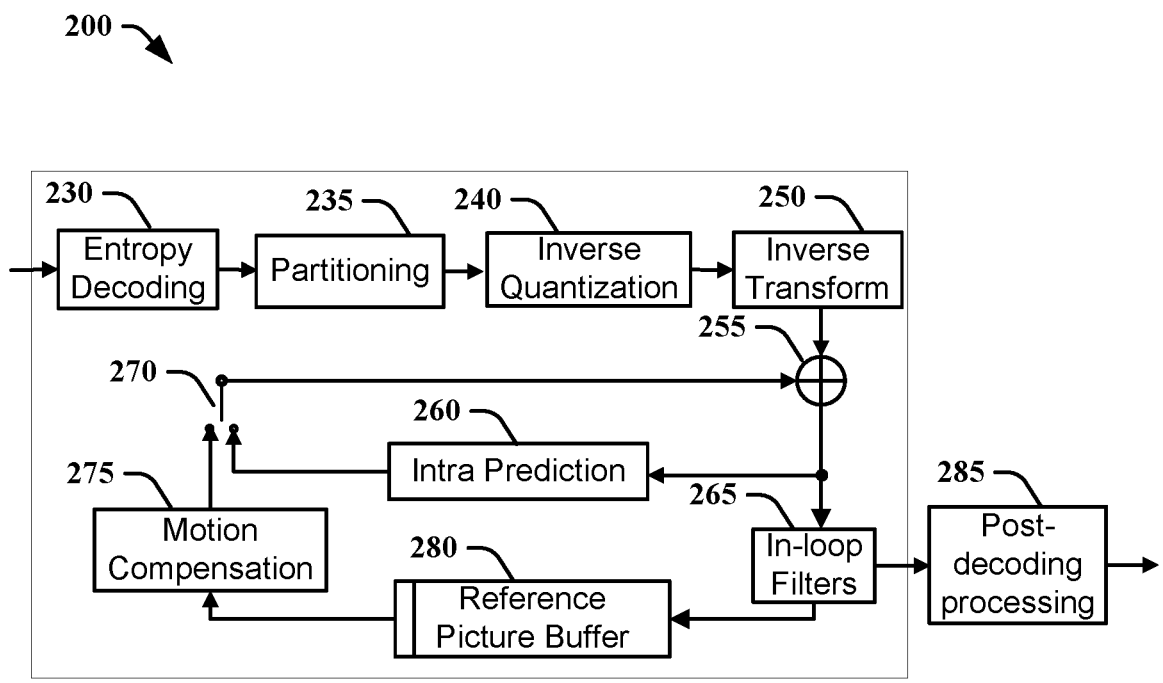
FIG. 2 illustrates a block diagram of an embodiment of a video decoder.

FIG. 2 illustrates a block diagram of an exemplary video decoder 200. In the exemplary decoder 200, a bitstream is decoded by the decoder elements as described below. Video decoder 200 generally performs a decoding pass reciprocal to the encoding pass as described in FIG. 1, which performs video decoding as part of encoding video data. FIG. 2 may illustrate an HEVC decoder, a JEM decoder, or a decoder employing technologies similar to HEVC or JEM.

In particular, the input of the decoder includes a video bitstream, which may be generated by video encoder 100. The bitstream is first entropy decoded (230) to obtain transform coefficients, motion vectors, picture partitioning information, and other coded information.

The picture partitioning information indicates how the picture is partitioned. The decoder may therefore divide (235) the picture according to the decoded picture partitioning information. The transform coefficients are de-quantized (240) and inverse transformed (250) to decode the prediction residuals.

Combining (255) the decoded prediction residuals and the predicted block, an image block is reconstructed. The predicted block may be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101).

The post-decoding processing may use metadata derived in the pre-encoding processing and signaled in the bitstream.

Figure 3:
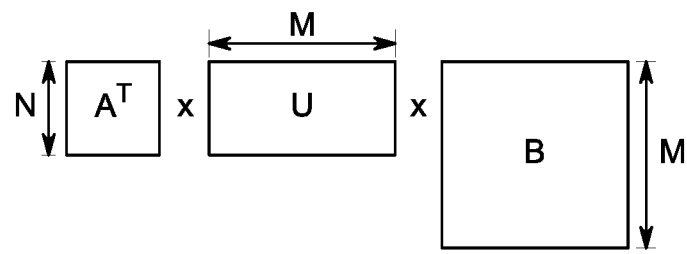
FIG. 3 is an illustration of a 2D transformation of an M×N residual block U.

As described above, the prediction residuals are transformed. For the transformation of the prediction residuals, considering an M×N (M columns×N rows) residual block ($[U]_{M \times N}$) that is input to a 2D M×N forward transform, the 2D transform is typically implemented by applying an N-point 1D transform to each column (i.e., vertical transform) and an M-point 1D transform to each row (i.e., horizontal transform) separately, as illustrated in FIG. 3. Mathematically, the forward transform can be expressed as:

$$[C]_{M \times N} = [A]^T_{N \times N} \times [U]_{M \times N} \times [B]_{M \times M}$$

where $[A]_{N \times N}$ is the N-point 1D transform matrix applied vertically, and $[B]_{M \times M}$ the M-point transform matrix applied horizontally, and "T" (superscript) is the matrix transposition operator. Thus, the separable transform can apply the horizontal and vertical transforms successively on each row and each column of the 2D prediction residual block. The inverse 2D M×N transform is thus expressed as follows:

$$[U]_{M \times N} = [A^{-1}]^T_{N \times N} \times [C]_{M \times N} \times [B^{-1}]_{M \times M}$$

For orthogonal transforms A and B, $A^{-1} = A^T$, and $B^{-1} = B^T$. Thus, the inverse transform can also be written as:

$$[U]_{M \times N} = [A]_{N \times N} \times [C]_{M \times N} \times [B]^T_{M \times M}$$

Note that some of the selected transform matrices are symmetric and thus self-inverse, that is, for an orthonormal transform matrix A, the following equalities hold:

$$A^{-1} = A^T, AA^T = I$$

where I is the identity matrix. If A is symmetric, then $A = A^T = A^{-1}$. This means that the inverse transform can be computed by using forward transform matrix, and no extra matrix for inverse transform needs to be stored. Note that N-point transform may also be referred to as "transform of size N."

Transform usually generates a compact representation of data for the subsequent processes of quantization and binary coding. Classically, DCT-II based transform is used for this purpose due to its ability to approximate Karhunen Loeve Transform (KLT) for highly correlated data. In addition, DCT-II is based on mirror extension of the discrete Fourier transform that has a fast implementation (known as Fast Fourier Transform or FFT). This property enables fast implementation of DCT-II, which is desired for both the hardware and software design. In this application, a DCT-II based transform (forward or inverse) may also be referred to as a DCT-II type of transform, or simply as DCT-II transform. Similar notations apply to other transform types, for example, but not limited to, DCT-IV, DCT-V, DCT-VIII, DST-I, DST-II and DST-VII. It should be noted, however, that the transforms are usually scaled and rounded to have an integer representation. In many solutions, further approximations are used to reduce the number of mathematical operations. In this application, both exact and approximate transforms of a particular type are considered as that particular type of transform.

DCT-II is used as the core transform in HEVC when processing certain block sizes, and the same vertical and horizontal 1D transforms are deployed for 2D separable transforms. Recently, the interest in using other types of discrete trigonometric transforms (DTTs) in addition to DCT-II has increased. For example, in the JEM, as described in an article by Chen, J., et al., entitled "Algorithm description of Joint Exploration Test Model 6 (JEM6)," Document JVET-F1001, 6$^{th}$ JVET Meeting, 2017, four other horizontal/vertical transforms, namely, DCT-V, DCT-VIII, DST-I and DST-VII, in addition to DCT-II and 4×4 DST-VII are defined, as shown in Table 1. Such a technique of using multiple transforms is denoted as EMT (Explicit Multiple core Transform) or AMT (Adaptive Multiple Transforms) during JEM development.

Note that we may also refer to DCT-II, DCT-V, DCT-VIII, DST-I and DST-VII as DCT2, DCT5, DCT8, DST1 and DST7, respectively.

TABLE 1

Basis functions of each transform used in the JVET video codec.

| Transform Type | Basis function $T_i(j)$, i, j = 0, 1, . . . , N − 1 |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$, where $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$, where $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

In JEM, the transform types for the horizontal transform and vertical transform may be different, and flags are used to control the combination of transforms. The addition of these transforms results in large increase of the encoder and decoder complexity and/or the memory requirement. This is because of the implementation of the transform process, which is achieved either by specific fast implementations, each one being specific to each transform type and block size, or by matrix multiplications which necessitates loading of forward and inverse transform matrices for each transform type and block size. Accordingly, the higher the number of additional transforms, the higher is the increased complexity and/or memory requirement.

Figure 4:
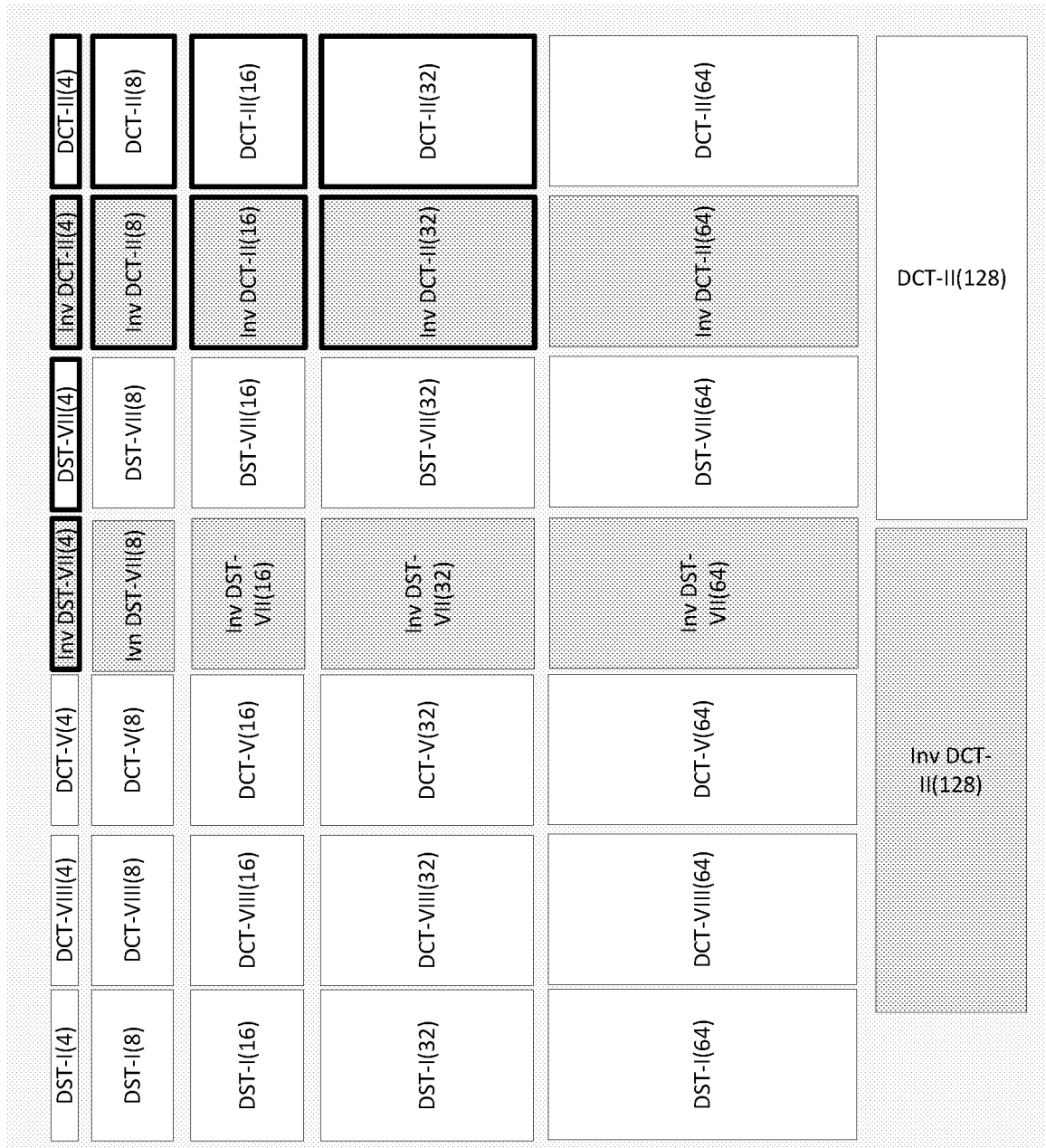
FIG. 4 is pictorial examples depicting a possible hardware implementation of EMT for both forward and inverse transform.

To describe the complexity issue, FIG. 4 illustrates a possible hardware implementation of EMT for both forward and inverse transforms. In FIG. 4, each rectangle represents a processing unit. For example, the rectangle with text "DCT-II(4)" is for computing a 4-point DCT-II. In essence, a rectangle in FIG. 4 corresponds to a hardware/software part. Thus, FIG. 4 illustrates the hardware area required by the encoder/decoder. The hardware area indicates the hardware size needed to implement a function in hardware. In general, the hardware area quantifies the number of hardware parts that are used for implementing the transforms, and is highly correlates with complexity. Note also that the rectangle sizes are scaled (almost) proportional to the transform size, since the operation is also proportional to the transform size.

It should be noted that the transforms of {DCT-V, DCT-VIII and DST-I} are self-inverse. In other words, the same algorithm can be used for computing the forward and inverse transforms. Thus, inverse transforms of {DCT-V, DCT-VIII and DST-I} are not depicted in FIG. 4. When comparing the EMT design to the HEVC transform design (rectangles in darker lines), we realize that implementation of EMT requires significant increase of the hardware area. In addition, the added transforms require higher number of operations, as their fast implementations are not as efficient as the DCT-II.

Recently, two approaches were introduced to solve the problem of increased memory and/or complexity due to the addition of new transforms. The first approach is based on using some low complexity transforms that can replace the high complexity ones. In particular, some variants of DTT transforms can be implemented using faster implementations than the others. The proposal was then to provide an alternative transform set that can be implemented with lower complexity. This approach, however, does not reduce the number of transforms. On the other hand, in the case of using matrix multiplications for transform implementation, the approach does not provide any improvement as the number of transform matrices remains the same.

The other approach factorizes DCT-V and DCT-VIII transforms (both included in JEM) in terms of DCT-VI and DST-VII, respectively, as shown below:

$$DCT5 = S \times DCT6 \times R \quad (1)$$

$$DCT8 = S \times DST7 \times R \quad (2)$$

where S is a sign change matrix (a diagonal matrix with diagonal elements $((-1)^i, i=0, \ldots, N-1)$) and R is anti-diagonal identity matrix (all antidiagonal elements are 1). Using N=3 as the example, S and R are expressed as follows:

$$S = \begin{bmatrix} 1 & 0 & 0 \\ 0 & -1 & 0 \\ 0 & 0 & 1 \end{bmatrix}, R = \begin{bmatrix} 0 & 0 & 1 \\ 0 & 1 & 0 \\ 1 & 0 & 0 \end{bmatrix},$$

$$S = S^{-1}, \quad R = R^{-1}.$$

Recognizing that DCT-VI can be realized through a fast implementation of DCT-II, the second approach, based on Eq. (1), uses the fast implementation of DCT-II to compute DCT-V. Then, based on Eq. (2), a fast implementation of DST-VII is used to compute DCT-VIII. The idea is then to use the fast implementation of DCT-II and DST-VII to compute DCT-V and DST-VIII. Although the second approach can reduce the coding complexity, it requires different architectures for computing DCT-VIII and DCT-V.

The present embodiments are directed to reducing the complexity for computing different types of transforms. In particular, the intrinsic relationship between different transforms is utilized, and the fact the DCT-II transform can be decomposed into DCT-II and DCT-IV of half size is employed. The proposed techniques can reduce the overall number of algorithms/hardware pieces used for implementing the EMT design. On the other hand, the proposed techniques enable computing different transforms from the DTT family using a single architecture, which enables high flexibility in the transform design that can potentially improve the coding efficiency.

Figure 5:
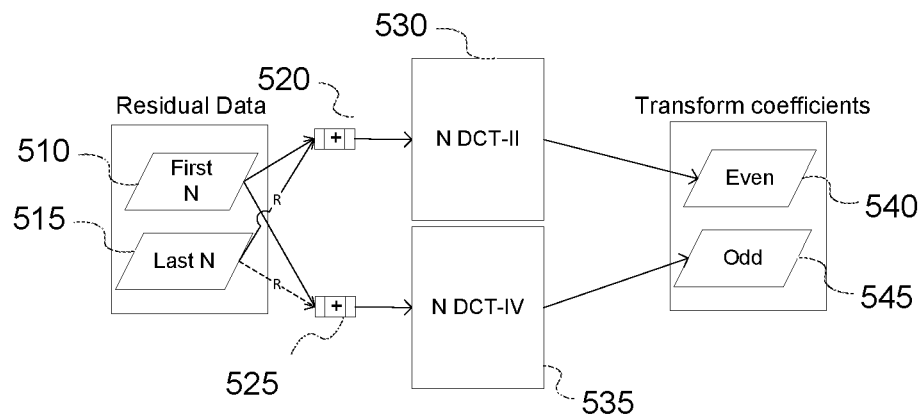
FIG. 5 is a pictorial example depicting the decomposition of 2N-point DCT-II into N-point DCT-II and N-point DCT-IV.

In one embodiment, most of the DTT transforms are derived using the odd and even implementation of DCT-II. This is achieved by decomposing DCT-II into two transforms and performing some pre/post-processing to derive the rest of the transforms, as indicated in FIG. 5. The pre/post-processing are simply sign changing and reverse ordering. To explain the decomposition, the following relationships should be noted:

1. A DCT-II of length of 2N-point can be computed from DCT-II and DCT-IV, each of length of N, where R is for reversing the order, and the dash line corresponds to a negative sign.
2. The inverse transform of some DTTs is the forward transform of some others (Table 2).

As shown in FIG. 5, the second half (515) of the input residual data is reversed. Then the first half (510) and the reversed second half is summed up (520), and transformed (530) using N-point DCT-II. On the other hand, the difference (525) between the first half and the reversed second half is calculated (525), and the difference is transformed using N-point DCT-IV (535). The transform result from N-point DCT-II forms the even part (540) of transform coefficients, and the transform result from N-point DCT-IV forms the odd part (545) of transform coefficients. Note here the even part includes transform coefficients C[i], i=0, 2, . . . 2N−2, and the odd part includes C[i], i=1, 3, . . . , 2N−1.

TABLE 2

Relationships between some DTT transforms.

| T | $T^{-1}$ | R T S | S T R | R $T^{-1}$ S | S $T^{-1}$ R |
|---|---|---|---|---|---|
| DCT-II | DCT-III | DST-II | DCT-II | DCT-III | DST-III |
| DCT-III | DCT-II | DCT-III | DST-III | DST-II | DCT-II |
| DCT-IV | DCT-IV | DST-IV | DST-IV | DST-IV | DST-IV |
| DST-II | DST-III | DCT-II | DST-II | DST-III | DCT-III |
| DST-III | DST-II | DST-III | DCT-III | DCT-II | DST-II |
| DST-IV | DST-IV | DCT-IV | DCT-IV | DCT-IV | DCT-IV |

In Table 2, $T^{-1}$ is the inverse transform of transform T, S is a sign changing matrix and R is a reverse ordering matrix as used in Eqs. (1) and (2). For a transform in column "T", performing $T^{-1}$, R T S, S T R, R $T^{-1}$ S and S $T^{-1}$ R will result in the transforms in columns "T", "R T S", "S T R", "R $T^{-1}$ S" and "S $T^{-1}$ R", respectively.

For example, from Table 2, DST-II is obtained from the existing DCT-II algorithm by performing the following steps:

1. Revert the sign of odd ordered input sequence (i.e., "S"),
2. Perform the forward DCT-II transform,
3. Reverse the order of the resulting coefficients (i.e., "R").

For a simpler implementation, it is possible in some scenarios to skip the post processing step of sign changing, and perform only the reverse ordering step. This type of transform is known as flipped transform. For example, flipped DST-VII is used in AV1 video compression standard. Then, the following flipped transforms can be obtained from Table 2: Flipped DCT-III, Flipped DCT-IV, Flipped DST-III and Flipped DST-IV. The interest of using these transform is that they are faster as the post processing step is neglected.

The decomposition of 2N-point DCT-II into N-point DCT-II and N-point DCT-IV is useful, as it provides a recursive implementation. This is because the N-point DCT-II can further be computed from N/2-point DCT-II and N/2-point DCT-IV. Thus, only DCT-II of smallest size is needed to be implemented, along with the DCT-IV of the rest of sizes. For example, when transform size for DCT-II are 4, 8, 16, 32, 64 and 128, a DCT-II for size of 4×4 is needed, and DCT-IV for sizes of 4, 8, 16, 32 and 64 are needed.

In another example, an implementation of DCT-II of size of 4, and DCT-IV for sizes of 4 and 8 will enable the computation of the following transforms:
1. DCT-II of size 4, from the existing implementation of DCT-II of size 4.
2. DCT-IV of size 4, from the existing implementation of DCT-IV of size 4.
3. DCT-II of size 8, from the existing implementations of DCT-II of size 4 and DCT-IV of size 4.
4. DCT-IV of size 8, from the existing implementation of DCT-IV of size 8.
5. DCT-II of size 16, from the existing implementations of DCT-II of size 4 and DCT-IV of sizes 4 and 8.

In addition to those transforms, other transforms can be computed from the relationships as given in Table 2, such as DST-IV from DCT-IV and DST-II from DCT-II.

A sample Matlab code of the recursive implementation of DCT-II is shown below, where the input "Res" is a vector of length N and represents input data to be transformed, "MinSize" is the minimum block size using DCT-II, and "Coeff" is the output. Because the transforms are implemented in a separable manner using 1D transforms in the horizontal and vertical directions, the Matlab code is based on the 1D transforms.

```
function Coeff = TrDCT_II_Recursive(Res, MinSize, N)
N2=N/2;
NormalizatonFactor = 1/sqrt(2);
OutputIdx = 1:N;
while (1)
    FirstN = Res(1:N2); % first half of input
    LastN_R = Res(2*N2:-1:N2+1); % R: second half of input reversed
    Odd = TrDCT_IV(FirstN-LastN_R); % perform DCT-IV transform
    Coeff(OutputIdx(2:2:end)) = Odd *NormalizatonFactor;
    if (N2 == MinSize)
        % perform DCT-II of minimum size
        Even = TrDCT_II(FirstN+LastN_R); % perform DCT-II transform
        Coeff(OutputIdx(1:2:end)) = Even *NormalizatonFactor;
        break;
    end
    % update
    Res = FirstN+LastN_R;
    OutputIdx = OutputIdx(1:2:end);
    N2 = N2/2;
    NormalizatonFactor = NormalizatonFactor * 1/sqrt(2);   end
end
```

Figure 6:
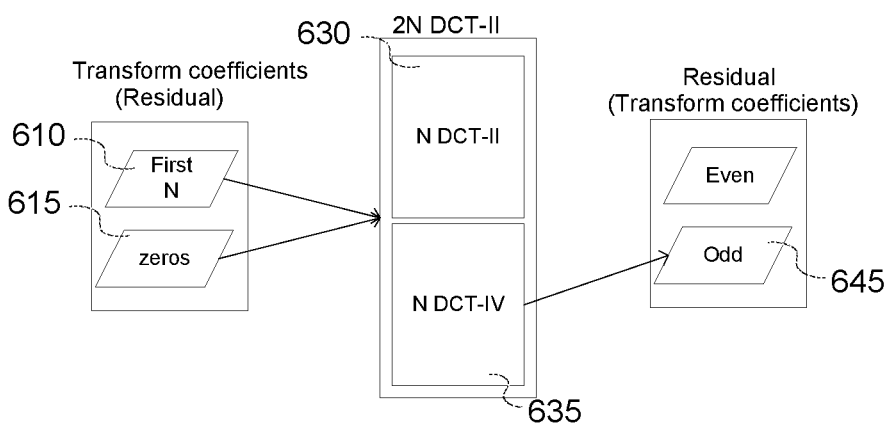
FIG. 6 is a pictorial example depicting the calculation of N-point DCT-IV with of 2N-point DCT-II.

Function 1. A sample function for recursively computing DCT-II from DCT-IV implementations, and a DCT-II implementation of minimum size On the other hand, this decomposition simplifies the design of transform since N-point DCT-IV is inherently implemented inside the 2N-point DCT-II design. Thus, N-point DCT-IV can be computed from 2N-point DCT-II (630, 635) by padding (615) the input (610) with zeros and extracting (645) the odd coefficients only, as shown in FIG. 6. If the input is transform coefficients, the output will be residual data and vice versa. In the middle, 2N DCT-II is either inverse transform in the first case and the forward transform in the second case.

A sample MATLAB code for computing the N-point DCT-IV from 2N-point DCT-II is provide here, where input "In" is transformed into output "Out" using N-point DCT-IV. This code can be used for both the forward and inverse transform as DCT-IV is self-inverse.

```
function Out = TrDCT_IV_FromDCT_II(In)
N=length(In);
In = [In; zeros(N,1)]; % padding with N zeros
Out = TrDCT_II(In); % perform 2N DCT-II
Out = Out(2:2:2*N)*sqrt (2); % extract the the odd coefficients
end
```

Figure 7:
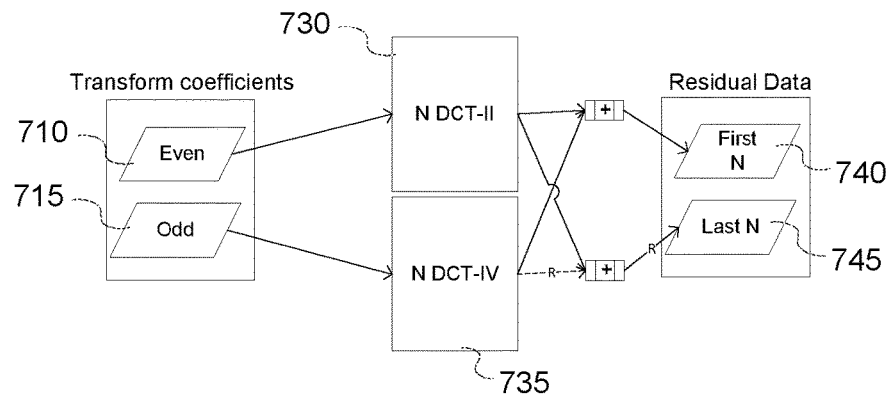
FIG. 7 is a pictorial example depicting the decomposition of 2N-point inverse DCT-II into N-point inverse DCT-II and N-point DCT-IV.

Function 2. A sample function for computing N-point DCT-IV from an existing 2N-point DCT-II In the same manner, the inverse transform of 2N-point DCT-II can be decomposed into the inverse transforms of N-point DCT-II and N-point DCT-IV. FIG. 7 illustrates the decomposition of 2N-point inverse DCT-II into N-point inverse DCT-II and N-point DCT-IV, where R is for reversing the order, and dash line correspond to negative sign. In particular, the even part (710) of the transform coefficients is inverse transformed by N-point DCT-II (730), and the odd part (715) is by N-point DCT-IV (735). The sum of the output from N-point DCT-II and N-point DCT-IV forms the first part (740) of the residual data, and the difference between the N-point DCT-II results and reversed N-point DCT-IV results forms the second part (745) of the residual data.

Therefore, the inverse transform can be computed recursively, as shown in the sample MATLAB code below, where the input "Coef" represents the transform coefficient, and "Res" is the output.

```
function Res = InvTrDCT_II_Recursive(Coef, MinSize)
N = length(Coef);
Res = zeros (N,1);
N2 =MinSize;
Depth = log2(N/MinSize);
NormalizationFactor = (1/sqrt(2))^Depth;
% DCT-II of even coefficients
```

-continued

```
CurIdx = 1:2^(Depth-1):N;
EvenCoeff = Coef(CurIdx(1:2:end));
Res(1:N2) = InvTrDCT_II(EvenCoeff) *NormalizationFactor;  % FirstN2
(MinSize) coefficients
for D=Depth:-1:1
    % DCT-IV of odd coefficients
    CurIdx = 1:2^(D-1):N;
    Odd = Coef(CurIdx(2:2:end));
    LastN = TrDCT_IV(Odd) *NormalizationFactor;
    Res(N2+1:2*N2) = Res(N2:-1:1) - LastN(end:-1:1); % last N
    Res(1:N2) = Res(1:N2) + LastN;   % First N
    % update
    NormalizatonFactor = NormalizatonFactor *sqrt(2);
    N2 = N2*2;
end
```

Function 3. A sample function for recursively computing inverse DCT-II from an existing DCT-IV, and inverse DCT-II of minimum size It should be noted that in actual implementation, the normalization factor of square root of 2 is not required. This is because the transform matrices are usually scaled by a factor that is multiple of the square root of the input vector size. Specifically in JVET, for vector to be transformed of length N, the corresponding N×N transform matrix is scaled by:

$$S=\sqrt{N}\times 256$$

Thus, for computing the N-point DCT-IV using the implementation of 2N-point DCT-II, the DCT-II matrix scale ($S_{2N}$) is:

$$S_{2N}=\sqrt{2\times N}\times 256=\sqrt{2}\times\sqrt{N}\times 256=\sqrt{2}S_N$$

Accordingly, the required V is normalization factor is already implemented in the DCT-II matrix.

As described above, the following tools are provided:
1. Computing DCT-II from the implementation of DCT-IV (recursively), and DCT-II of the minimum size.
2. Computing DCT-IV from the existing DCT-II of double size.
3. Computing the DCT-III, DST-III, DST-IV from the forward/inverse DCT-II/DCT-IV implementation and utilizing the relationships given in Table 2.

Figure 8:
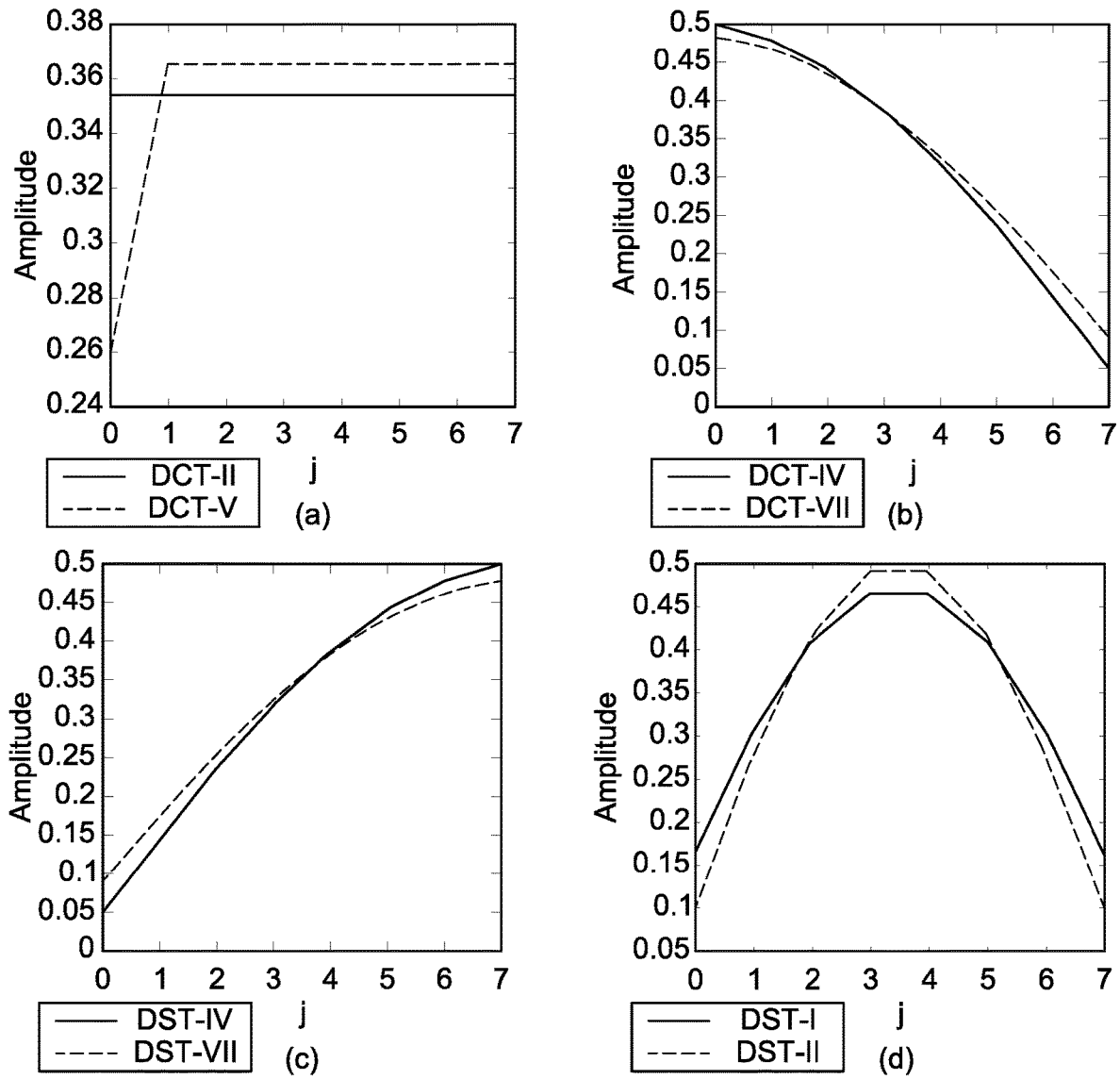
FIGS. 8(a)-(d) are pictorial examples depicting the lowest frequency basis functions of DCT-II vs. DCT-V, DCT-IV vs. DCT-VIII, DST-IV vs. DST-VII and, DST-I vs. DST-II, respectively.

These tools can be used to simplify the design of EMT, by taking into consideration the following properties of EMT set {DCT-V, DCT-VIII, DST-I, DST-VII}:
1. DCT-V has a quasi-constant lowest frequency basis function, this makes it possible to be replaced with DCT-II, which has similar property (FIG. 8(a)).
2. DCT-VIII has a decreasing lowest frequency basis function, this makes it possible to be replaced with DCT-IV, which has similar property (FIG. 8 (b)).
3. DST-VII has an increasing lowest frequency basis function, this makes it possible to be replaced with DST-IV, which has similar property (FIG. 8 (c)).
4. DST-I has a centrally oriented lowest frequency basis function, this makes it possible to be replaced with DST-II, which has similar property (FIG. 8 (d)).

Accordingly, the EMT approximation employs the following even transforms {DCT-II, DCT-IV, DST-II, DST-IV}. It should be noted that this set is the same as proposed in an article by De-Luxán-Hernández, Santiago, et al., entitled "Block adaptive selection of multiple core transforms for video coding," Picture Coding Symposium (PCS), 2016. IEEE, 2016, which shows a significant gain.

Figure 9:
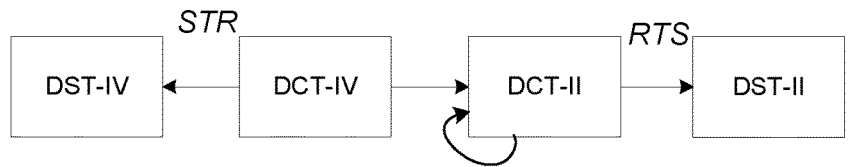
FIG. 9 is a pictorial example depicting the relationship between transforms.

This approximation provides a great deal of complexity reduction, because all these transforms can be computed from each other, as shown in FIG. 9, assuming DCT-IV is available:
1. DST-IV can be computed from DCT-IV by reversing the input samples, performing the forward transform and changing the sign of odd coefficients.
2. DCT-II can be computed from half size DCT-II and half size DCT-IV, as shown in FIG. 5.
3. DST-II can be computed from DCT-II by changing the sign of odd samples, performing the transform and reversing the order of the output coefficients.

Figure 10:
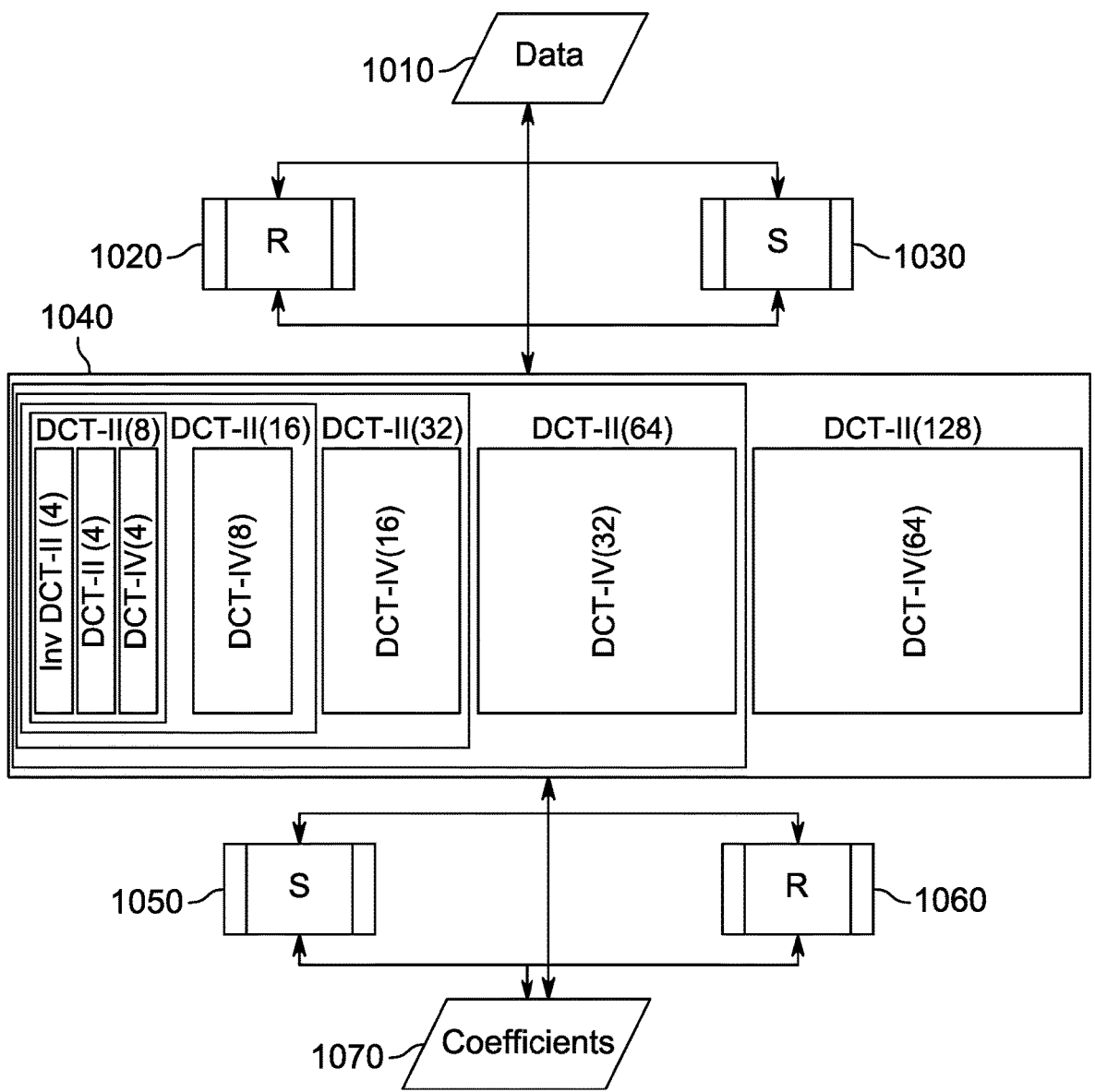
FIG. 10 illustrates a modified EMT design for forward or inverse transform, according to an embodiment.

Putting this all together, FIG. 10 illustrates a modified EMT design for forward or inverse transform, according to an embodiment. Here, we assume the transforms as shown in FIG. 4 are approximated, namely, DST-I, DCT-VIII, DCT-V, DST-VII for 4, 8, 16, 32, 64, and DCT-II for size 4, 8, 16, 32, 64, and 128, forward and inverse, are to be approximated.

In FIG. 10, input data 1010 is transformed to output data 1070. Operations R (1020, 1050) and S (1030, 1060) are used for pre-processing and post-processing. Forward and inverse DCT-II (4), DCT-IV of 4, 8, 16, 32, and 64 are included (1040). Using the pre-/post-processing and the included transforms, the transforms as shown in FIG. 4 can be implemented. For example, DST-IV of 64, . . . , 4 can be obtained from RTS of DCT-IV, and DST-II of 64, . . . 4 can be obtained from RTS of DCT-II, DST-IV from STR of DCT-IV.

When compared with the current design of EMT as shown in FIG. 4, FIG. 10 provides a great simplification. The proposed architecture needs the implementations of DCT-IV for the required sizes (i.e., DCT-IV for 4, 8, 16, 32, 64, and forward and inverse DCT-II for size 4), and DCT-II is computed from the relation between DCT-II and DCT-IV (as shown in FIG. 5). Thus, only the minimum size of DCT-II implementation is required.

Approximating JEM EMT with Even DTTs

Figure 11:
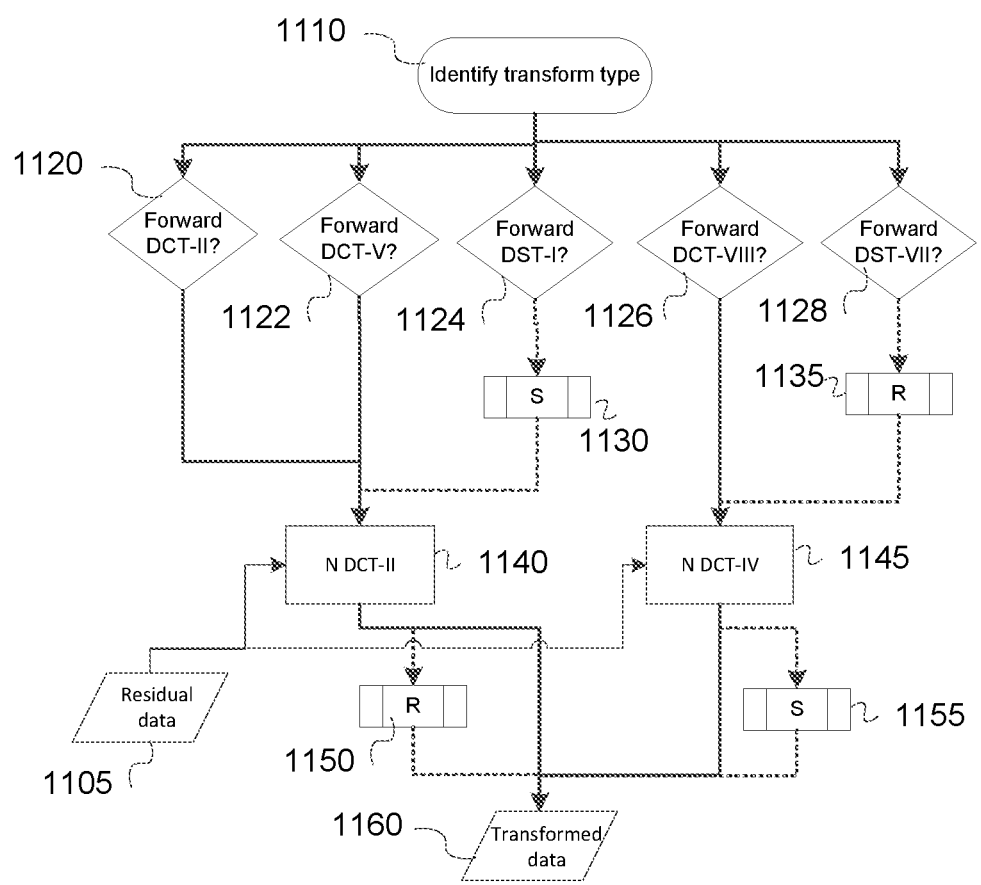
FIG. 11 illustrates a design that uses a proposed transform set in the encoder side, according to an embodiment.

FIG. 11 illustrates a design that uses the modified transform set in the encoder side, according to an embodiment. Instead of the EMT set used in JEM, we use another transform set, namely, {DCT-II, DCT-IV, DST-II, DST-IV}, that are computationally much simpler, which can lead to large hardware/software simplification. In particular, when DCT-V, DST-I, DCT-VIII or DST-VII is identified, DCT-II, DST-II, DCT-IV, DST-IV is calculated respectively.

As shown in FIG. 11, for a residual block (1105) to be transformed into transformed data (1160), the type of transform to be performed is identified (1110). The identification of the transform type is based on the encoder design, for example, based on the prediction mode. This identification function, as done in the JEM, outputs one of the following transforms type: {DCT-II, DCT-V, DCT-VIII, DST-I and DST-VII}.

Then, the output value of the identification function is checked, and depending on this value, the following is performed, where the implementation of DCT-II and DCT-IV can either be obtained, for example, by Function 1 or Function 2:
1. If the considered transform is DCT-VIII (1126), the following step applies:
   a. directly apply the forward DCT-IV algorithm (1145) for computing the forward transform.
2. If the considered transform is DST-VII (1128), the following steps apply:
   a. first, reverse (1135) the order of the input residual block data to be transformed,
   b. then apply the forward DCT-IV algorithm (1145) for computing the forward transform,
   c. then perform the sign change operation (1155, multiply odd ordered coefficients by −1).
3. If the considered transform is DST-I (1124), the following steps apply:
   a. first, perform the sign change operation to the input residual block data (1130, multiply odd ordered coefficients by −1),
   b. then apply the forward DCT-II algorithm (1140) for computing the forward transforms,
   c. then reverse the order of the resulting coefficients (1150).
4. If the considered transform is DCT-II (1120) or DCT-V (1122), the following step applies:
   a. employ the forward DCT-II algorithm (1140) for computing the forward transform.

Figure 12:
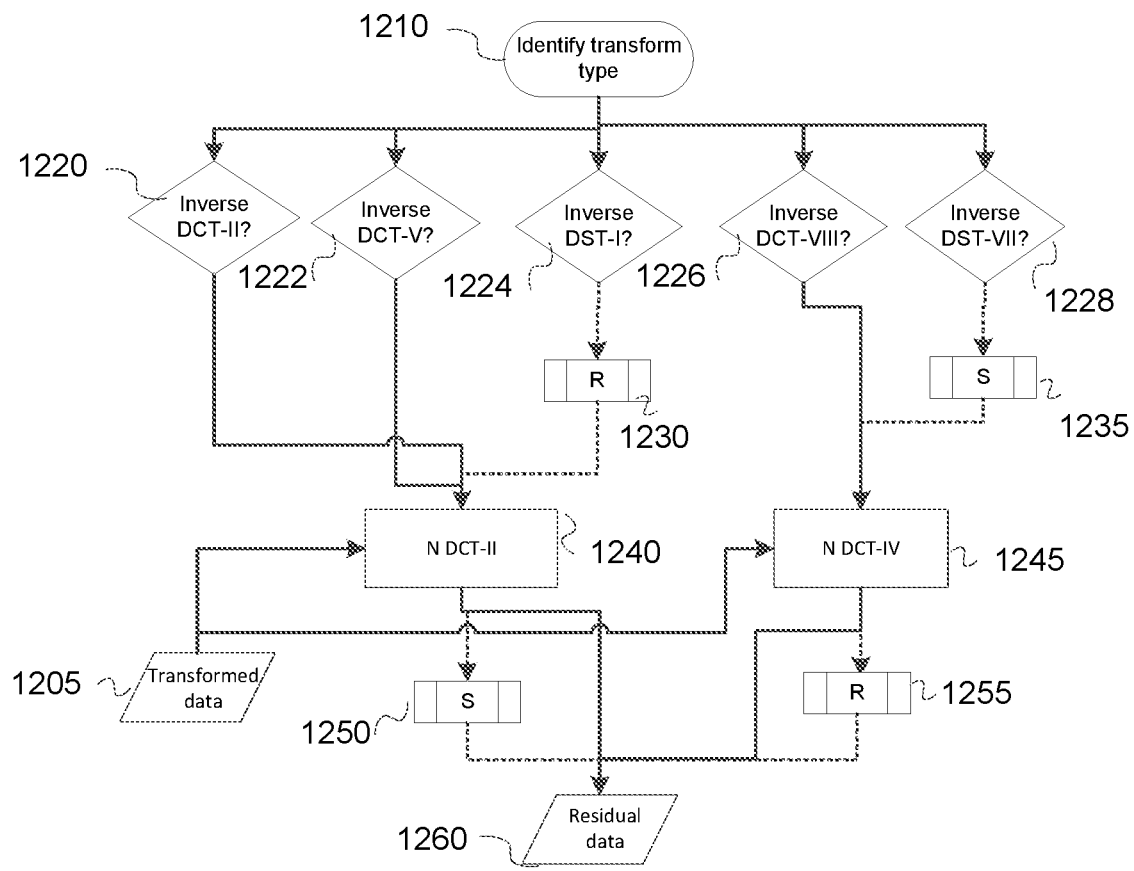
FIG. 12 illustrates a design that uses a proposed transform set in the decoder side, according to an embodiment.

FIG. 12 illustrates a design that uses the proposed transform set in the decoder side, according to an embodiment. For a block of transformed data (1205) to be inverse transformed to obtain the residual data (1260), the type of transform to be performed is identified (1210). The same identification function should be used at the decoder side as the encoder side. Then, the output value of the identification function checked. Depending on this value, the following process is performed as follows, where the implementation of DCT-II and DCT-IV can either be obtained, for example, by Function 3 or Function 2:
1. If the considered transform is DCT-VIII (1226), the following step applies:
   a. apply the existing forward DCT-IV algorithm (1245) for computing the forward transform.
2. If the considered transform is DST-VII (1228), the following steps apply:
   a. first, perform a sign change operation (1235, multiply the odd ordered coefficients by −1),
   b. then apply the forward DCT-IV algorithm (1245) for computing the forward transform,
   c. then reverse (1255) the order of the resulting coefficients.
3. If the considered transform is DST-I (1224), the following steps apply:
   a. first, reverse (1230) the order of the input data,
   b. then, apply the existing inverse DCT-II algorithm (1240) for computing the inverse transform,
   c. then, perform a sign change operation (1250, multiply the odd ordered coefficients by −1).
4. If the considered transform is DCT-II (1220) or DCT-V (1222), the following step applies:
   a. Apply the existing inverse DCT-II algorithm (1240) for computing the inverse transform.

Extended EMT Set for Better Compression Efficiency

Figure 13:
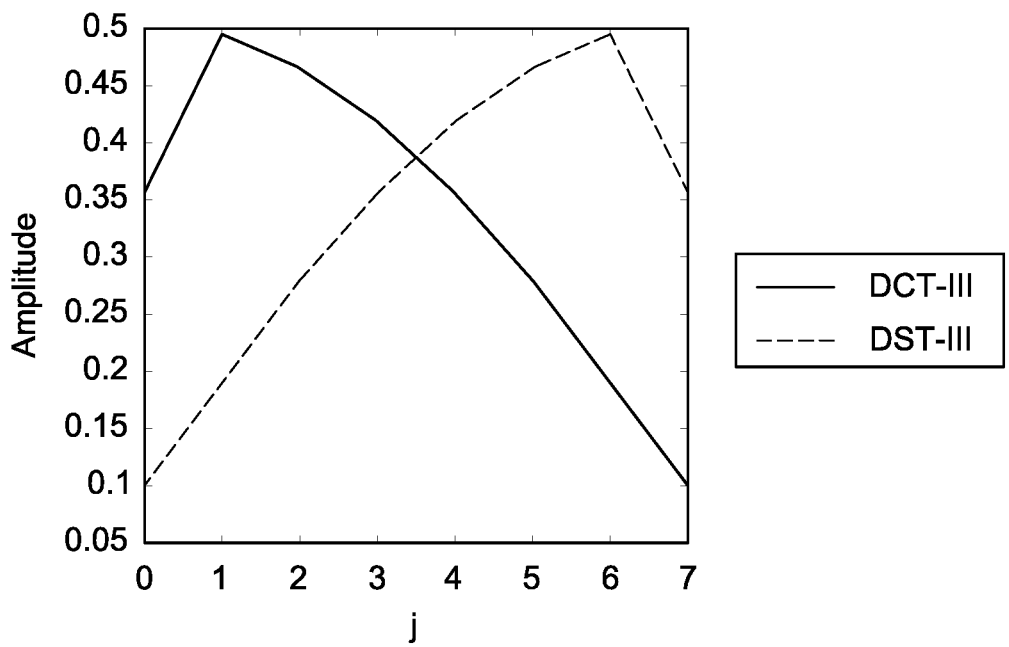
FIG. 13 is a pictorial example depicting the lowest frequency basis functions of DCT-III and DST-III.
Figure 14:
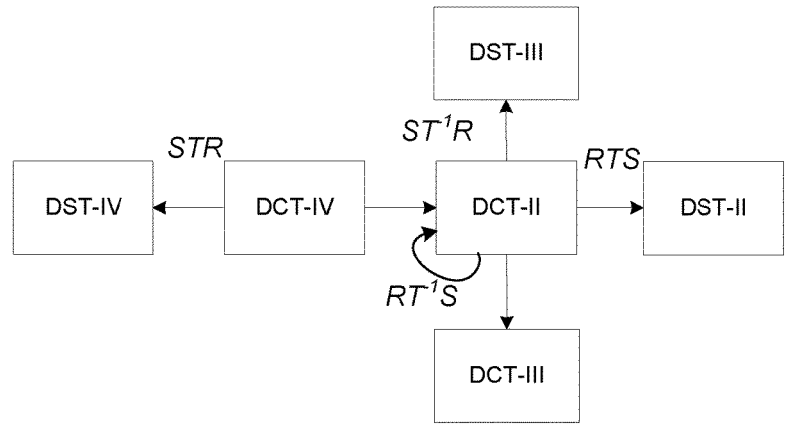
FIG. 14 is another pictorial example depicting the relationship between transforms.

Other than the transform set that approximates the current EMT in JEM, the proposed solution can also be used to derive other transforms, for example, as shown in Table 2. The transforms are the DCT-III and DST-III, which represent transforms with decreasing/increasing basis functions with discontinuity, as illustrated in FIG. 13 and Table 3. Then, the overall number of possible transforms is 6, namely, {DCT-II, DCT-III, DCT-IV, DST-II, DST-III and DST-IV}. These transforms can potentially be included in the transform set, such that it fits the residual data properties of certain prediction mode, transform block sizes etc. FIG. 14 illustrates the relationship between these six transforms.

TABLE 3

Transform basis functions for DCT-III and DST-III

| Transform Type | Basis function $T_i(j)$, i, j = 0, 1, ..., N − 1 |
|---|---|
| DST-III | $T_i(j) = \varepsilon_j \cdot \sqrt{\dfrac{2}{N}} \cdot \sin\left(\dfrac{\pi \cdot \left(i + \dfrac{1}{2}\right) \cdot (j+1)}{N}\right)$ |
| DCT-III | $T_i(j) = \delta_j \cdot \sqrt{\dfrac{2}{N}} \cdot \cos\left(\dfrac{\pi \cdot \left(i + \dfrac{1}{2}\right) \cdot j}{N}\right)$ |

Figure 15:
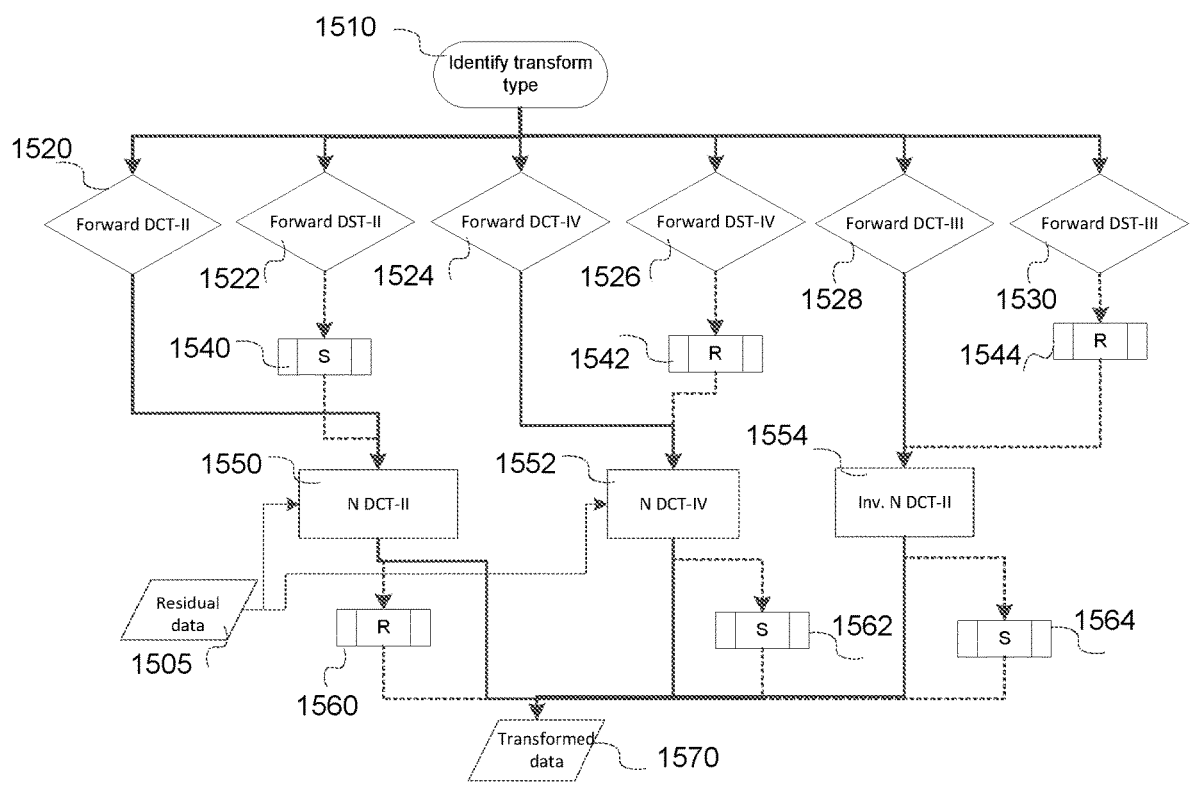
FIG. 15 illustrates a design that uses another proposed transform set in the encoder side, according to another embodiment.

FIG. 15 illustrates a design that uses this new transform set in the encoder side, according to an embodiment. Similar to the previous embodiment, we assume that for each residual block (1505) to be transformed into transformed data (1570), a first step identifies (1510) the type of transform to be performed. This function, which may depend on the residual block properties (prediction mode, size, neighboring block properties, etc.), outputs one of the following transforms types: {DCT-II, DCT-III, DCT-IV, DST-II, DST-III and DST-IV}.

Then, the output value of the identification function is checked, and depending on this value, the following is performed, where the implementation of DCT-II, DCT-IV and inverse DST-II can either be obtained, for example, by Function 1, Function 2 and Function 3:
1. If the considered transform is DCT-II (1520), DCT-IV (1524) or DCT-III (1528), the following step applies:
   a. directly apply the forward DCT-II (1550), forward DCT-IV (1550) or inverse DCT-II algorithm (1554), respectively, for computing the forward transform.
2. If the considered transform is DST-IV (1526), the following steps apply:
   a. first, reverse (1542) the order of the input residual block data of the transform,
   b. then apply the existing forward DCT-IV algorithm (1552) for computing the forward transform,
   c. then perform the sign change operation (1562, multiply odd ordered coefficients by −1).
3. If the considered transform is DST-II (1522), the following steps apply:
   a. first, perform (1540) the sign change operation to the input residual data (multiply odd ordered coefficients by −1),
   b. then apply the existing forward DCT-II algorithm (1550) for computing the forward transform,
   c. then reverse (1560) the order of the resulting coefficients.

4. If the considered transform is DST-III (1530), the following step applies:
   a. first, reverse (1544) the order of the input residual data of the transform,
   b. then apply the existing inverse DCT-II algorithm (1554) for computing the forward transform,
   c. then perform the sign change operation (1564, multiply odd ordered coefficients by −1).

Figure 16:
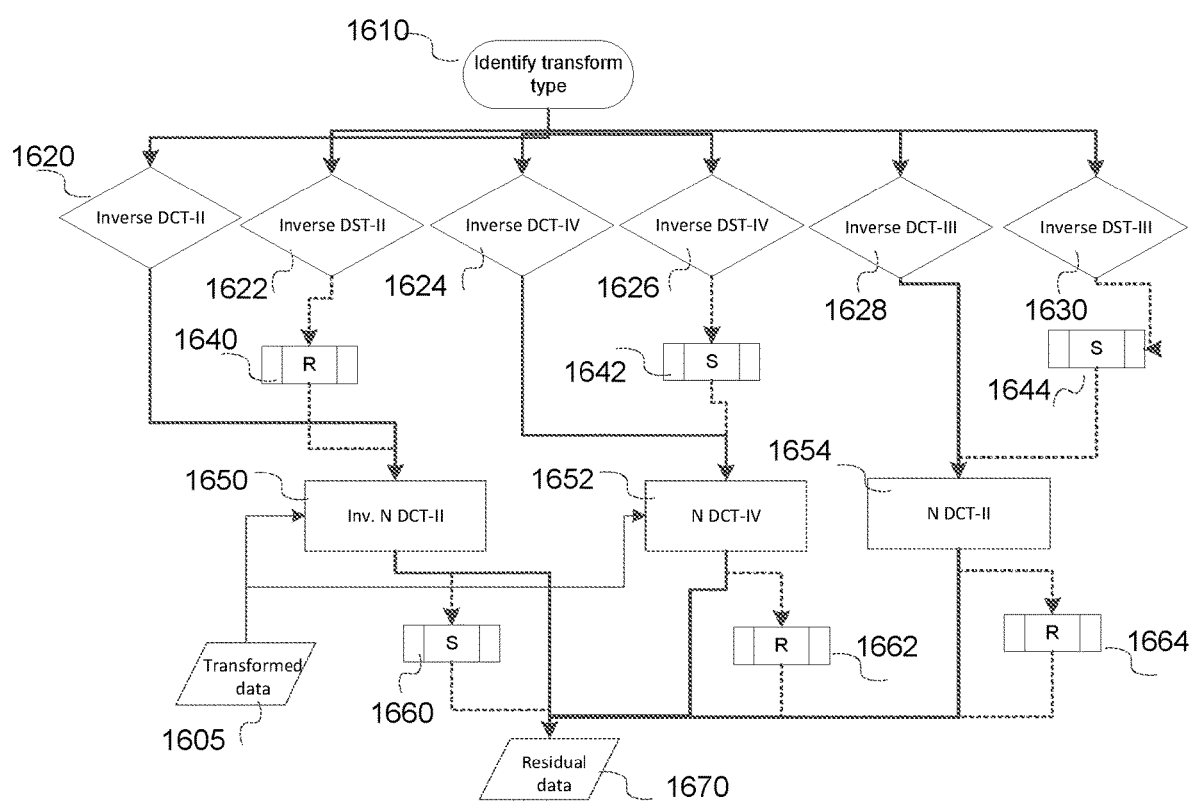
FIG. 16 illustrates a design that uses another proposed transform set in the decoder side, according to another embodiment.

FIG. 16 illustrates a design that uses this new transform set in the decoder side, according to an embodiment. Corresponding to the encoder side, for a block of transformed data (1605) to be inverse transformed into residual data (1670), the same first step as performed in the encoder identifies (1610) the transform type. Then, the output value of the identification function is checked, and depending on this value, the following process is performed as follows, where the implementation of DCT-II and DCT-IV can be obtained, for example, either by Function 3 or Function 2:

1. If the considered transform is DCT-II (1620), DCT-IV (1624) or DCT-III (1628), the following step applies:
   a. apply the existing inverse DCT-II (1650), forward DCT-IV (1652) or forward DCT-II algorithm (1654), respectively, for computing the forward transform.
2. If the considered transform is DST-IV (1626), the following steps apply:
   a. first, perform a sign change operation (1642, multiply the odd ordered coefficients by −1),
   b. then apply the existing forward DCT-IV algorithm (1652) for computing the forward transform,
   c. then reverse (1662) the order of the resulting coefficients.
3. If the considered transform is DST-II (1622), the following steps apply:
   a. first, reverse (1640) the order of the input data,
   b. then, apply the existing inverse DCT-II algorithm (1650) for computing the inverse transform,
   c. then, perform a sign change operation (1660, multiply the odd ordered coefficients by −1).
4. If the considered transform is DST-III (1630), the following step applies:
   a. first, perform a sign change operation (1644, multiply the odd ordered coefficients by −1),
   b. then, apply the existing forward DCT-II algorithm for computing the forward transform,
   c. then, reverse (1664) the order of the input data.

In the above, a unified architecture is described, where all transforms are based on DCT-II, DCT-IV, R and S. Using a unified architecture that relies on the fast implementation of DCT-II and DCT-IV, which are even type transforms with existing fast algorithms, the proposed techniques can substantially speed up the current design of EMT.

The present techniques are flexible as they can either approximate all EMT transforms in terms of DCT-II, or augment the existing designs with DST-IV and DCT-IV as they are already available inside DCT-II.

In the above, all transforms are implemented through the unified architecture. The transform design can also be flexible to use other architecture. In one embodiment, it is noted that the unified architecture may work better for a specific range of block sizes. Therefore, in one embodiment, the unified architecture only applies to blocks that are larger than a certain transform block size while being smaller than another transform block size. For example, when 4×4 is the minimum block size for transform and 64×64 is the maximum block size, 4×4 transforms and 64×64 are implemented as matrix multiplication based on the transform basis function, and transforms for 8×8 and up to 32×32 would be implemented by the unified architecture. It is also possible that some types of the transforms are implemented by the unified architecture while others not.

The unified architecture has also another advantage in terms of hardware design. It significantly reduces the physical area required for the transform process and therefore reduces the power consumption. In addition, according to one embodiment, six transforms, namely DCT-II, DST-II, DCT-III, DST-III, DCT-IV, and DST-IV, are selected. Note that a subset of these transforms can be used as transforms. These transforms can fit different signal characteristics, and thereby enable better compression. Their deployment, however, should not be only restricted to the current design in JEM, but can be further applied to associate the transform set with the block size, prediction mode, and other features.

Various methods according to the present embodiments as described above may be used to modify, e.g., the transform module (125) and inverse transform module (250) of the JVET or HEVC encoder 100 and decoder 200 as shown in FIG. 1 and FIG. 2 respectively. Moreover, the present embodiments are not limited to JVET or HEVC, and may be applied to other standards, recommendations, and extensions thereof. The present embodiments can also be used for any video coding system, which utilizes the transforms that can be obtained from DCT-II and DCT-IV. For example, certain set of transforms that includes DST-IV. The idea then is to exploit the relationship between DST-IV and DCT-IV on one hand, and the relationship between DCT-IV and DCT-II on the other hand. These relationships can provide a simplified design, which requires less hardware area and complexity.

In the above, the transforms are applied to residual data to get transform coefficients. The techniques can also be applied to transform other data, for example, the signal directly when the prediction is skipped.

Various methods are described herein, and each of the methods comprises one or more steps or actions for achieving the described method. Unless a specific order of steps or actions is required for proper operation of the method, the order and/or use of specific steps and/or actions may be modified or combined. Unless indicated otherwise, or technically precluded, the aspects described in this document can be used individually or in combination. Various numeric values are used in the present document, for example, the number of transforms in the transform set. The specific values are for example purposes and the aspects described are not limited to these specific values.

Figure 17:
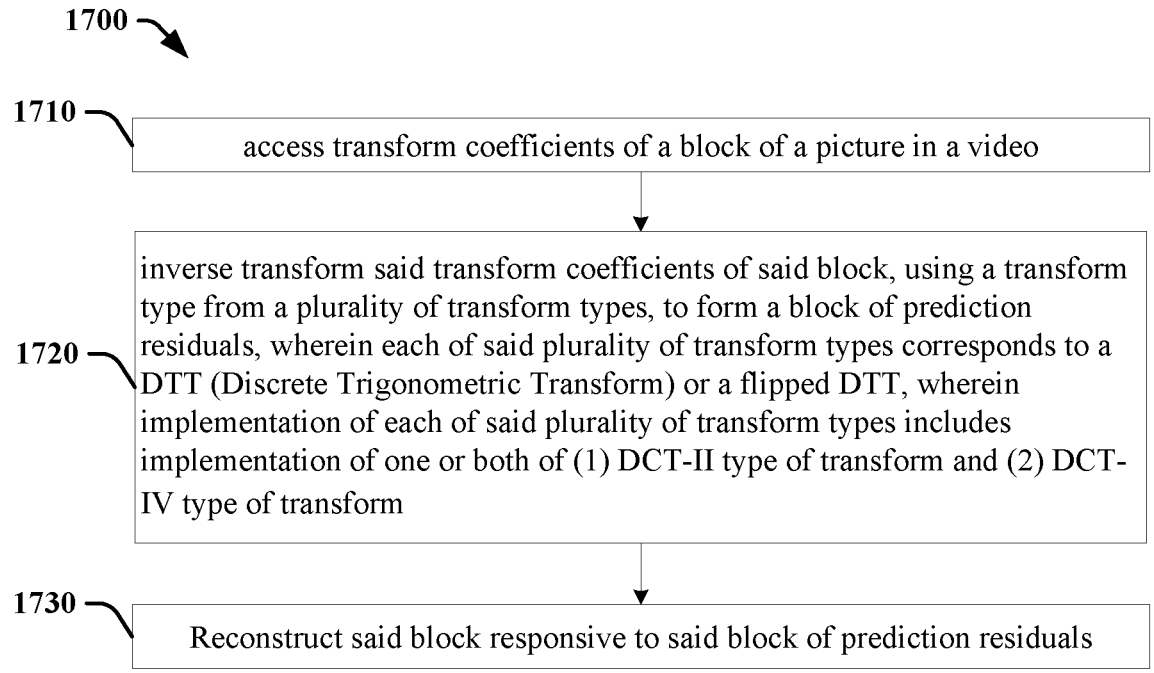
FIG. 17 illustrates a method of encoding a video using a unified transform architecture, according to an embodiment.

FIG. 17 illustrates an exemplary method (1700) of encoding a video using a unified transform architecture, according to an embodiment. At step 1710, transform coefficients of a block of a picture in a video are accessed, for example, from an entropy decoder. At step 1720, said transform coefficients of said block are inverse transformed, using a transform type from a plurality of transform types, to form a block of prediction residuals, wherein each of said plurality of transform types corresponds to a DTT (Discrete Trigonometric Transform) or a flipped DTT, wherein implementation of each of said plurality of transform types includes implementation of one or both of (1) DCT-II type of transform and (2) DCT-IV type of transform. At step 1730, said block is reconstructed responsive to said block of prediction residuals, for example, as a sum of a predicted block and said block of prediction residuals.

Figure 18:
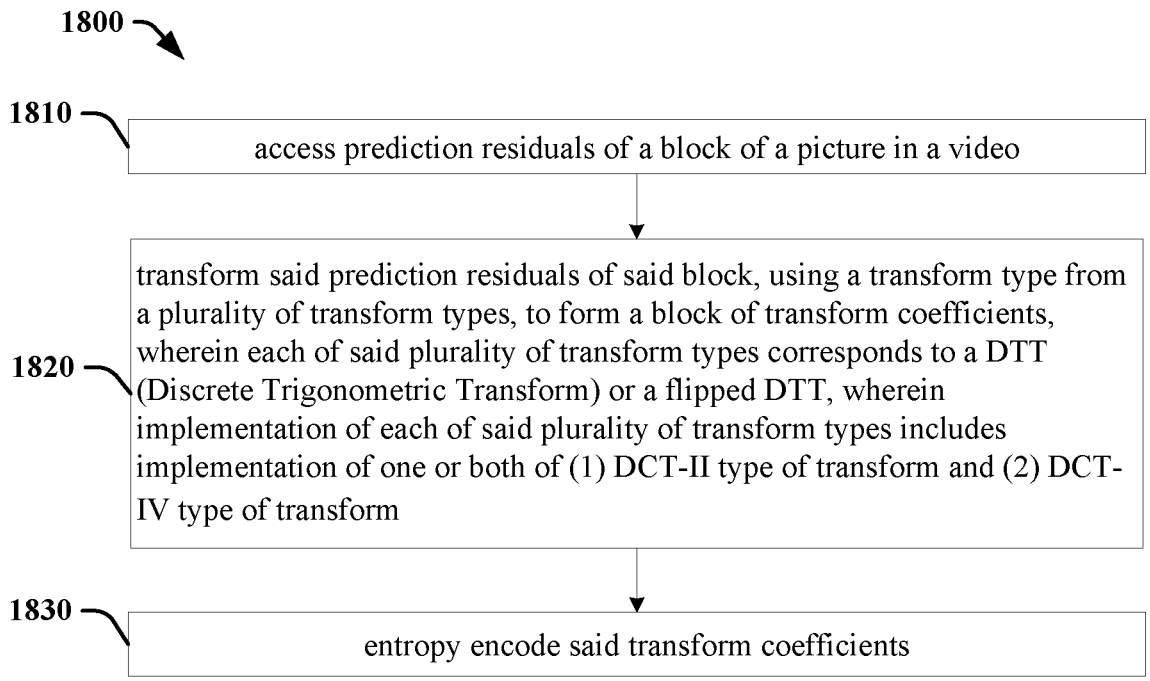
FIG. 18 illustrates a method of decoding a video using a unified transform architecture, according to an embodiment.

FIG. 18 illustrates an exemplary method (1800) of decoding a video using a unified transform architecture, according to an embodiment. At step 1810, prediction residuals of a block of a picture in a video are accessed, for example, from intra prediction or inter prediction. At step 1820, said prediction residuals of said block are transformed, using a transform type from a plurality of transform types, to form a block of transform coefficients, wherein each of said plurality of transform types corresponds to a DTT (Discrete Trigonometric Transform) or a flipped DTT, wherein implementation of each of said plurality of transform types includes implementation of one or both of (1) DCT-II type of transform and (2) DCT-IV type of transform. At step 1830, said transform coefficients are entropy encoded.

Figure 19:
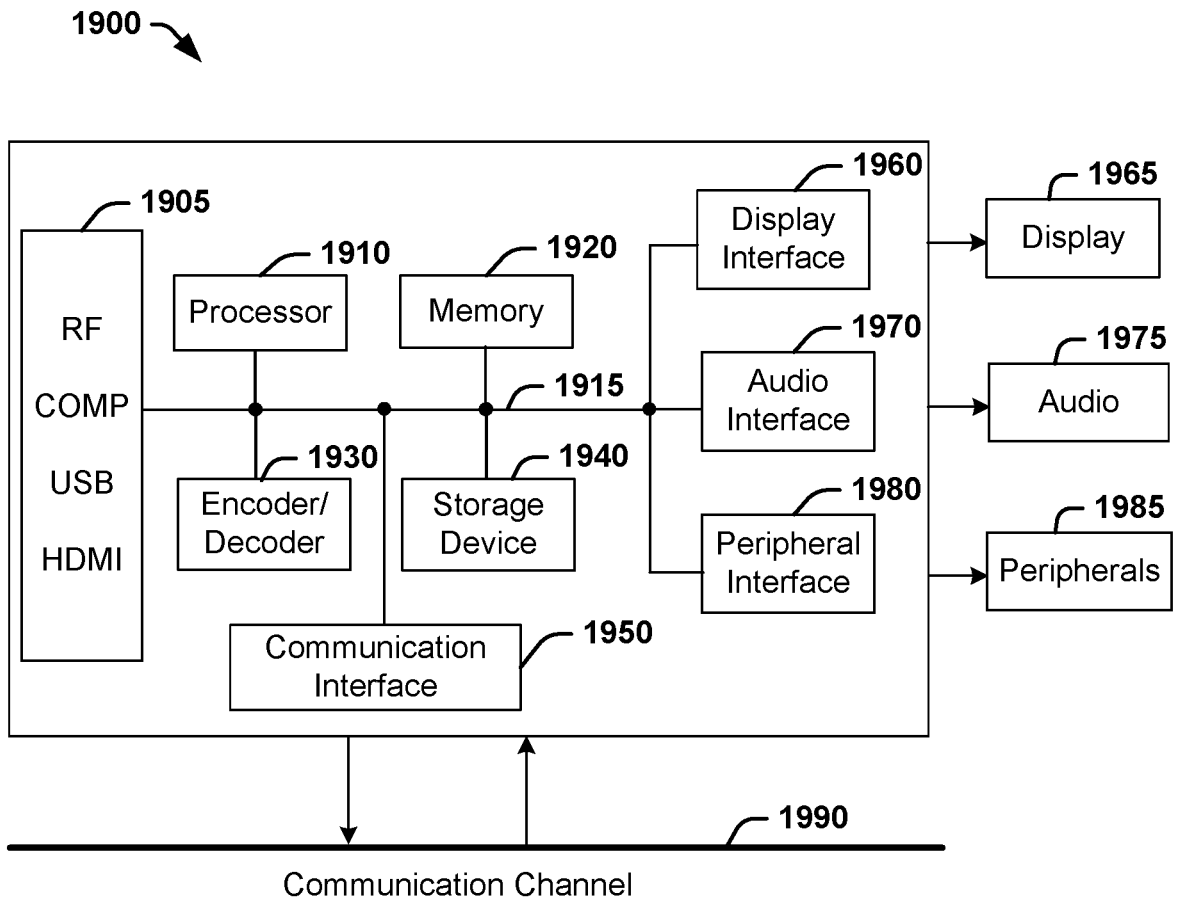
FIG. 19 illustrates a block diagram of a system within which aspects of the present embodiments can be implemented.

FIG. 19 illustrates a block diagram of an example of a system in which various aspects and embodiments are implemented. System 1900 can be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1900, singly or in combination, can be embodied in a single integrated circuit, multiple ICs, and/or discrete components. For example, in at least one embodiment, the processing and encoder/decoder elements of system 1900 are distributed across multiple ICs and/or discrete components. In various embodiments, the system 1900 is communicatively coupled to other systems, or to other electronic devices, via, for example, a communications bus or through dedicated input and/or output ports. In various embodiments, the system 1900 is configured to implement one or more of the aspects described in this document.

The system 1900 includes at least one processor 1910 configured to execute instructions loaded therein for implementing, for example, the various aspects described in this document. Processor 1910 can include embedded memory, input output interface, and various other circuitries as known in the art. The system 1900 includes at least one memory 1920 (e.g., a volatile memory device, and/or a non-volatile memory device). System 1900 includes a storage device 1940, which can include non-volatile memory and/or volatile memory, including, but not limited to, EEPROM, ROM, PROM, RAM, DRAM, SRAM, flash, magnetic disk drive, and/or optical disk drive. The storage device 1940 can include an internal storage device, an attached storage device, and/or a network accessible storage device, as non-limiting examples.

System 1900 includes an encoder/decoder module 1930 configured, for example, to process data to provide an encoded video or decoded video, and the encoder/decoder module 1930 can include its own processor and memory. The encoder/decoder module 1930 represents module(s) that can be included in a device to perform the encoding and/or decoding functions. As is known, a device can include one or both of the encoding and decoding modules. Additionally, encoder/decoder module 1930 can be implemented as a separate element of system 1900 or can be incorporated within processor 1910 as a combination of hardware and software as known to those skilled in the art.

Program code to be loaded onto processor 1910 or encoder/decoder 1930 to perform the various aspects described in this document can be stored in storage device 1940 and subsequently loaded onto memory 1920 for execution by processor 1910. In accordance with various embodiments, one or more of processor 1910, memory 1920, storage device 1940, and encoder/decoder module 1930 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1910 and/or the encoder/decoder module 1930 is used to store instructions and to provide working memory for processing that is needed during encoding or decoding. In other embodiments, however, a memory external to the processing device (for example, the processing device can be either the processor 1910 or the encoder/decoder module 1930) is used for one or more of these functions. The external memory can be the memory 1920 and/or the storage device 1940, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1900 can be provided through various input devices as indicated in block 1905. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1905 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1900 to other electronic devices across USB and/or HDMI connections. It is to be understood that various aspects of input processing, for example, Reed-Solomon error correction, can be implemented, for example, within a separate input processing IC or within processor 1910 as necessary. Similarly, aspects of USB or HDMI interface processing can be implemented within separate interface ICs or within processor 1910 as necessary. The demodulated, error corrected, and demultiplexed stream is provided to various processing elements, including, for example, processor 1910, and encoder/decoder 1930 operating in combination with the memory and storage elements to process the datastream as necessary for presentation on an output device.

Various elements of system 1900 can be provided within an integrated housing, Within the integrated housing, the various elements can be interconnected and transmit data therebetween using suitable connection arrangement 1915, for example, an internal bus as known in the art, including the I2C bus, wiring, and printed circuit boards.

The system 1900 includes communication interface 1950 that enables communication with other devices via communication channel 1990. The communication interface 1950 can include, but is not limited to, a transceiver configured to transmit and to receive data over communication channel 1990. The communication interface 1950 can include, but is not limited to, a modem or network card and the communication channel 1990 can be implemented, for example, within a wired and/or a wireless medium.

Data is streamed to the system 1900, in various embodiments, using a Wi-Fi network such as IEEE 802.11. The Wi-Fi signal of these embodiments is received over the communications channel 1990 and the communications interface 1950 which are adapted for Wi-Fi communications. The communications channel 1990 of these embodiments is typically connected to an access point or router that provides access to outside networks including the Internet for allowing streaming applications and other over-the-top communications. Other embodiments provide streamed data to the system 1900 using a set-top box that delivers the data over the HDMI connection of the input block 1905. Still other embodiments provide streamed data to the system 1900 using the RF connection of the input block 1905.

The system 1900 can provide an output signal to various output devices, including a display 1965, speakers 1975, and other peripheral devices 1985. The other peripheral devices 1985 include, in various examples of embodiments, one or more of a stand-alone DVR, a disk player, a stereo system, a lighting system, and other devices that provide a function based on the output of the system 1900. In various embodiments, control signals are communicated between the system 1900 and the display 1965, speakers 1975, or other peripheral devices 1985 using signaling such as AV.Link, CEC, or other communications protocols that enable device-to-device control with or without user intervention. The output devices can be communicatively coupled to system 1900 via dedicated connections through respective interfaces 1960, 1970, and 1980. Alternatively, the output devices can be connected to system 1900 using the communications channel 1990 via the communications interface 1950. The display 1965 and speakers 1975 can be integrated in a single unit with the other components of system 1900 in an electronic device, for example, a television. In various embodiments, the display interface 1960 includes a display driver, for example, a timing controller (T Con) chip.

The display 1965 and speaker 1975 can alternatively be separate from one or more of the other components, for example, if the RF portion of input 1905 is part of a separate set-top box. In various embodiments in which the display 1965 and speakers 1975 are external components, the output signal can be provided via dedicated output connections, including, for example, HDMI ports, USB ports, or COMP outputs.

According to at least one embodiment, a method for decoding video data is presented, comprising: accessing transform coefficients of a block of a picture in a video; inverse transforming said transform coefficients of said block, using a transform type from a plurality of transform types, to form a block of prediction residuals, wherein each of said plurality of transform types corresponds to a DTT (Discrete Trigonometric Transform) or a flipped DTT, wherein implementation of each of said plurality of transform types includes implementation of one or both of (1) DCT-II type of transform and (2) DCT-IV type of transform; and reconstructing said block responsive to said block of prediction residuals.

According to at least one embodiment, a method for encoding video data is presented, comprising: accessing prediction residuals of a block of a picture in a video; transforming said prediction residuals of said block, using a transform type from a plurality of transform types, to form a block of transform coefficients, wherein each of said plurality of transform types corresponds to a DTT (Discrete Trigonometric Transform) or a flipped DTT, wherein implementation of each of said plurality of transform types includes implementation of one or both of (1) DCT-II type of transform and (2) DCT-IV type of transform; and entropy encoding said transform coefficients.

According to at least one embodiment, an apparatus for decoding video data is presented, comprising at least a memory and one or more processors coupled to said at least a memory, wherein said one or more processors are configured to: access transform coefficients of a block of a picture in a video; inverse transform said transform coefficients of said block, using a transform type from a plurality of transform types, to form a block of prediction residuals, wherein each of said plurality of transform types corresponds to a DTT (Discrete Trigonometric Transform) or a flipped DTT, wherein implementation of each of said plurality of transform types includes implementation of one or both of (1) DCT-II type of transform and (2) DCT-IV type of transform; and reconstruct said block responsive to said block of prediction residuals.

According to at least one embodiment, an apparatus for encoding video data is provided, comprising at least a memory and one or more processors coupled to said at least a memory, wherein said one or more processors are configured to: access prediction residuals of a block of a picture in a video; transform said prediction residuals of said block, using a transform type from a plurality of transform types, to form a block of transform coefficients, wherein each of said plurality of transform types corresponds to a DTT (Discrete Trigonometric Transform) or a flipped DTT, wherein implementation of each of said plurality of transform types includes implementation of one or both of (1) DCT-II type of transform and (2) DCT-IV type of transform; and entropy encode said transform coefficients.

According to at least one embodiment, an apparatus for decoding video data is presented, comprising: means for accessing prediction residuals of a block of a picture in a video; means for transforming said prediction residuals of said block, using a transform type from a plurality of transform types, to form a block of transform coefficients, wherein each of said plurality of transform types corresponds to a DTT (Discrete Trigonometric Transform) or a flipped DTT, wherein implementation of each of said plurality of transform types includes implementation of one or both of (1) DCT-II type of transform and (2) DCT-IV type of transform; and means for entropy encoding said transform coefficients.

According to at least one embodiment, an apparatus for encoding video data is presented, comprising: means for accessing prediction residuals of a block of a picture in a video; means for transforming said prediction residuals of said block, using a transform type from a plurality of transform types, to form a block of transform coefficients, wherein each of said plurality of transform types corresponds to a DTT (Discrete Trigonometric Transform) or a flipped DTT, wherein implementation of each of said plurality of transform types includes implementation of one or both of (1) DCT-II type of transform and (2) DCT-IV type of transform; and means for entropy encoding said transform coefficients.

According to at least one embodiment, said selected transform type of said plurality of transform types is implemented by further using at least a first operation and a second operation, wherein said first operation reverses order of input data, and wherein the second operation changes signs of odd elements of input data. When said selected transform type is a flipped DTT type, said second operation is not performed According to at least one embodiment, when implementation of a transform type of said plurality of transform types includes DTT implementation and non-DTT operation, said DTT implementation only corresponds to said DCT-II type of transform and said DCT-IV type of transform.

According to at least one embodiment, only a single DCT-II type of transform is implemented for said DTT implementation. Said single DCT-II type of transform can correspond to a forward DCT-II or an inverse DCT-II.

According to at least one embodiment, a size of said block being N, wherein said single DCT-II type of transform is at size $N/2^l$, l being an integer greater than 0, and wherein DCT-II type of transforms at size N is implemented recursively based on DCT-II at size $N/2^l$.

According to at least one embodiment, DCT-IV type at sizes of $N/2^n$, n being an integer from 0 to 1, are implemented for DCT-IV type of transform. $N/2^l$ can be larger than a minimum possible size of said block.

According to at least one embodiment, implementation of a transform other than DCT-IV type includes recursively performing: 2M-point DCT-II by performing M-point DCT-II and M-point DCT-IV.

According to at least one embodiment, said plurality of transform types include at least one of DCT-III type of transform and DST-III type of transform. For example, said plurality of transform types correspond to {DCT-II, DST-II, DCT-III, DST-III, DCT-IV, DST-IV} or a subset thereof.

According to at least one embodiment, each of said plurality of transform types corresponds to a separable transform.

According to at least one embodiment, a bitstream is generated by performing: accessing prediction residuals of a block of a picture in a video; transforming said prediction residuals of said block, using a transform type from a plurality of transform types, to form a block of transform coefficients, wherein each of said plurality of transform types corresponds to a DTT (Discrete Trigonometric Transform) or a flipped DTT, wherein implementation of each of said plurality of transform types includes implementation of one or both of (1) DCT-II type of transform and (2) DCT-IV type of transform; and entropy encoding said transform coefficients.

Various implementations involve decoding. "Decoding," as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

The invention claimed is:

1. A method for video decoding, comprising:
accessing transform coefficients of a block of a picture in a video;
inverse transforming said transform coefficients of said block, using a DCT-IV transform type, to form a block of prediction residuals,
wherein an inverse transform for N-point DCT-IV type is obtained from an inverse transform for 2N-point DCT-II type by performing:
accessing an array of N transform coefficients,
padding said array of N transform coefficients with N zeros to form a data array of 2N samples,
inverse transforming said data array of 2N samples with said inverse transform for 2N-point DCT-II type to form an output data array of 2N samples, and
extracting N odd samples from said output data array of 2N samples as an array of N prediction residuals corresponding to said array of N transform coefficients; and
reconstructing said block responsive to said block of prediction residuals.

2. A non-transitory computer readable storage medium having stored thereon instructions for video decoding according to the method of claim 1.

3. The method of claim 1, wherein both said DCT-II type and DCT-IV type are available for inverse transforming during decoding of said picture.

4. A method for video encoding, comprising:
accessing prediction residuals of a block of a picture in a video;
transforming said prediction residuals of said block, using a DCT-IV transform type, to form a block of transform coefficients,
wherein a transform for N-point DCT-IV type is obtained from a transform for 2N-point DCT-II type by performing:
accessing an array of N prediction residuals,
padding said array of N prediction residuals with N zeros to form a data array of 2N samples,
transforming said data array of 2N samples with transform for 2N-point DCT-II type to form an output data array of 2N samples, and
extracting N odd samples from said output data array of 2N samples as an array of N transform coefficients corresponding to said array of N prediction residuals; and
entropy encoding said transform coefficients.

5. A non-transitory computer readable storage medium having stored thereon instructions for video encoding according to the method of claim 4.

6. The method of claim 4, wherein both said DCT-II type and DCT-IV type are available for transforming during encoding of said picture.

7. An apparatus for decoding video data, comprising:
one or more processors, wherein said one or more processors are configured to:
access transform coefficients of a block of a picture in a video;
inverse transform said transform coefficients of said block, using a DCT-IV transform type, to form a block of prediction residuals,
wherein an inverse transform for N-point DCT-IV type is obtained from an inverse transform for 2N-point DCT-II type by performing:
accessing an array of N transform coefficients,
padding said array of N transform coefficients with N zeros to form a data array of 2N samples,
inverse transforming said data array of 2N samples with said inverse transform for 2N-point DCT-II type to form an output data array of 2N samples, and
extracting N odd samples from said output data array of 2N samples as an array of N prediction residuals corresponding to said array of N transform coefficients; and
reconstruct said block responsive to said block of prediction residuals.

8. The apparatus of claim 7, wherein both said DCT-II type and DCT-IV type are available for inverse transforming during decoding of said picture.

9. An apparatus for encoding video data, comprising:
one or more processors, wherein said one or more processors are configured to:
access prediction residuals of a block of a picture in a video;
transform said prediction residuals of said block, using a DCT-IV transform type, to form a block of transform coefficients,
wherein a transform for N-point DCT-IV type is obtained from a transform for 2N-point DCT-II type by performing:
accessing an array of N prediction residuals,
padding said array of N prediction residuals with N zeros to form a data array of 2N samples, transforming said data array of 2N samples with said transform for 2N-point DCT-II type to form an output data array of 2N samples, and extracting N odd samples from said output data array of 2N samples as an array of N transform coefficients corresponding to said array of N prediction residuals; and entropy encode said transform coefficients.

10. The apparatus of claim 9, wherein both said DCT-II type and DCT-IV type are available for transforming during encoding of said picture.

* * * * *